Figure 1:
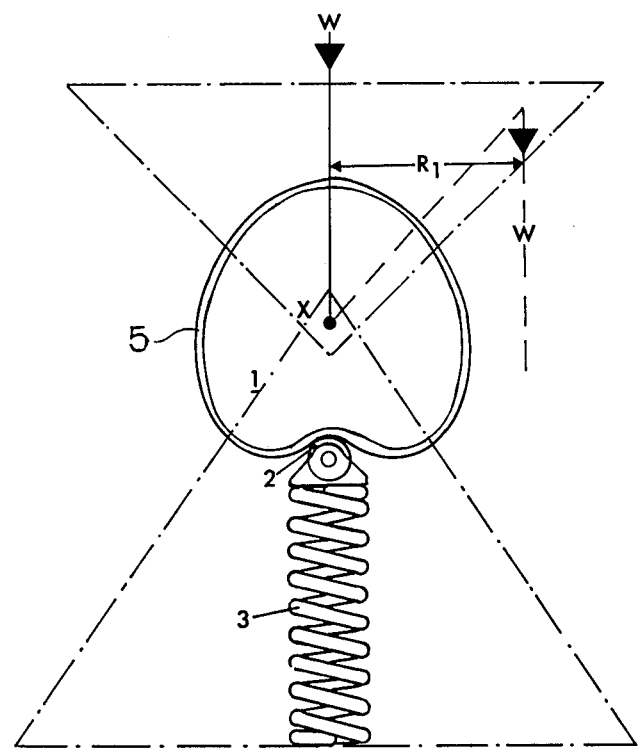

United States Patent [19]
Russell

[11] Patent Number: 4,726,253
[45] Date of Patent: Feb. 23, 1988

[54] TORQUE COUNTERBALANCING MECHANISMS

[75] Inventor: Lionel V. F. Russell, Bury St. Edmunds, United Kingdom

[73] Assignee: W. Vinten Limited, England

[21] Appl. No.: 389,109

[22] Filed: Jun. 16, 1982

Related U.S. Application Data

[63] Continuation of Ser. No. 148,745, May 12, 1980, abandoned.

[30] Foreign Application Priority Data

May 19, 1979 [GB] United Kingdom ............... 7917493

[51] Int. Cl.⁴ ............................................. F16H 53/06
[52] U.S. Cl. ..................................... 74/569; 403/229; 267/169; 16/322
[58] Field of Search ............. 74/569, 531; 108/1, 108/2, 6, 8; 403/229; 267/169; 16/321, 322; 248/596, 580

[56] References Cited

U.S. PATENT DOCUMENTS

| | | | |
|---|---|---|---|
| 324,444 | 8/1985 | Wolf | 16/322 |
| 809,310 | 1/1906 | Long | 108/8 |
| 3,087,583 | 4/1963 | Bruns | 267/169 |
| 4,085,634 | 4/1978 | Sattler | 74/569 |

FOREIGN PATENT DOCUMENTS

| | | | |
|---|---|---|---|
| 2342392 | 10/1975 | France | 16/331 |
| 549957 | 10/1956 | Italy | 74/569 |
| 175134 | 2/1922 | United Kingdom | 74/569 |
| 667080 | 2/1952 | United Kingdom | 74/569 |

*Primary Examiner*—Gary L. Smith
*Assistant Examiner*—Rodney M. Lindsey
*Attorney, Agent, or Firm*—Larson and Taylor

[57] ABSTRACT

A torque counterbalancing mechanism for use on tiltable tables, the mechanism comprising a cam operated on by a spring loaded cam follower so that their interaction produces a force equal and opposite to the torque generated as the tiltable table, with load, rotates either side of the vertical. At the null position, i.e. no torque, the spring is at rest with no pre-stressing and means are provided for changing the effective length of the spring, thereby changing the RATE of the spring, to adjust the mechanism to accommodate different heights of the center of gravity of the load or changes in load.

6 Claims, 2 Drawing Figures

TORQUE COUNTERBALANCING MECHANISMS

This is a continuation of the application Ser. No. 148,745 filed May 12, 1980, and now abandoned.

This invention relates to torque counterbalancing mechanisms and more particularly, though not exclusively, to torque counterbalancing mechanisms using the interaction of a spring loaded cam follower on a cam face.

The mechanisms are especially useful on the likes of tilt mounting heads such as the type used on television equipment, scanner mounts and more recently, tracker mounts, where it is advantageous to counterbalance the torque caused by the load as the load is pivotably moved about the vertical. The torque to be counterbalanced being the load, or weight, multiplied by the distance moved by the centre of gravity of the load, or weight, about a point vertically above the pivot point.

Mechanisms of the types using spring loaded cam followers on cam faces are known especially those of the type where either or both, spring or cam are changed to accommodate changes in out of balance load which in turn causes the amount of torque per degree of rotation to change. Mechanisms are also known wherein the amount of "spring" pressure applied to the cam follower is adjusted by compressing the spring to a new basic setting i.e. the spring is at all times under a degree of compression.

With all the aforementioned mechanisms problems exist, inso-much as it is time consuming to change the spring or cam to suit the changed load which causes a change in torque counterbalancing and in the case of varying the basic degree of compression of the spring a comparatively complicated mechanism is required on the cam and cam follower.

It is therefore an object of this invention to provide a torque counterbalancing mechanism wherein these problems are substantially eliminated and a simple method of varying the degree of torque counterbalance is provided.

According to the invention we provide a torque counterbalancing mechanism comprising a spring loaded cam follower and a cam wherein the pivot point of the cam is in line with the pivot point of the cam follower and centre of gravity of the load to be counterbalanced and the rise characteristics of the cam are determined in conjunction with the spring RATE.

According to a further aspect of the invention we provide a method of altering the spring RATE to suit changes in range of basic torque counterbalancing requirements wherein said method comprises the use of part of said spring as a screw thread and a second threaded means for effectively changing the operable length of the spring.

Figure 2:

The invention will now be described, by way of example only, in conjunction with the accompanying illustrations in which, FIG. 1 shows the principle of operation and FIG. 2 shows the method of changing the spring RATE.

Referring to FIG. 1 a cam (1) which in practice would be rigidly fixed at point x to the pivot point of a tiltable table, shown in broken chain, so that the cam would rotate symetrically about the pivot point as the tilt table top (represented by the upper triangle in FIG. 1) pivots about point x has, bearing on its periphery, a cam follower (2). Preferably the cam follower would be a roller bearing, ballrace, or the like so that rotation of the cam, in action, would be relatively free from friction and it is also preferably that the periphery of the cam is of hardened material as indicated at (5). The cam follower (2) is suitably attached to the end of a spring (3), which in operation would be attached to the base of the tiltable table (represented by the lower triangle in FIG. 1), it is rotatable about its axis and its axis lies on the longitudinal centre line of the spring. The longitudinal axis of the spring preferably lies on a line drawn through point x of the cam and the cam is preferably symetrically positioned about the vertical line.

When in the null position, i.e. when the centre of gravity of the load (W) is vertically above point x on the cam, the spring (3), the rate of which is chosen in conjunction with the cam rise characteristics; is under no pre-stress and the cam follower (2) rests at the null point of the cam. The cam rise characteristics may be defined as the imaginary line traced out by the cam follower as the follower rides on the periphery of the cam or, stated differently, as the rate of rise per degree of angular rotation of the cam. As the centre of gravity of the load, W on the diagram, is rotated about point x of the cam, the cam follower, riding on the cam, which is rotating in sympathy with W, compresses the spring which applies a force equal and opposite to the torque $W R_1$ generated by the centre of gravity of W rotating to its new position by a distance $R_1$ from the vertical.

Torque equals WR

With W vertically above point x, R=0 therefore torque=0.

As W rotates about point x, R gains in significance producing torque WR which increases according to the sine law, i.e., as a sine function of the angle between a line drawn from the point x through the center of gravity W, and the vertical. By converting the sine law with the use of a suitable cam to a linear law, compression of spring (3) from zero will, as previously stated, produce a force equal and opposite to the torque WR and the load W will be balanced in its new position off the vertical.

As the torque will vary with different loads, assuming the same values of R, or different heights of the centre of gravity of the load the counteracting force required to balance the new load will also vary. This change of counteracting force may be achieved by using a different RATE spring. However, as previously stated, it is inconvenient to change a spring for each change of load. This problem is solved by altering the effective length of the spring and hence the spring rate. Referring to FIG. 2 the spring (3) acts as a female thread and a male thread (4) when screwed into or out of the spring alters the effective length, and hence the RATE, without putting the spring under compression. The contact between the cam and cam follower is therefore effectively zero at the null position and the counteracting force due to interaction between cam, cam follower and spring may be made equal and opposite, within the tolerance of the spring, irrespective of load change.

It will be obvious to one skilled in the art that various modifications may be made without departing from the spirit of the invention. For example, where it is known that the torque generated by a certain load is always going to remain within fixed parameters a spring may be manufactured to the correct RATE using such as Belleville washers or the like, or a preselected RATE spring may be used for either convenience or cheapness.

It will also be obvious to one skilled in the art that the use of a female threaded block on the outside of the spring would operate the same as the male described.

It will additionally be obvious to one skilled in the art that though drawn with the load vertically above the springs longitudinal axis, so that the tilt table is rotated to place the centre of gravit inline with the three axes; i.e. the cam axis, the cam follower axis and the longitudinal axis of the spring; the three axes, in line, may be rotated to align with the centre of gravity of the load to maintain the required counterbalancing force.

I claim as my invention:

1. A torque counterbalancing mechanism for a tilt mounting head of the type including two relatively moveable parts at least one of which is pivotable about a corresponding pivot point, said mechanism comprising: a cam follower operably connected to one of two such relatively moveable parts of a said tilt mounting head, a cam, having predetermined rise characteristics and being pivotable about a pivot point and operatively connected to the other of the two relatively moveable parts of the tilt mounting head, for controlling the movement of said cam follower in accordance with the rise characteristics of the cam, the pivot point of the cam and the pivot point of the at least one pivoted part being on the same pivot axis, and a spring for loading said cam follower and having a spring rate determined in conjunction with the rise characteristics of the cam so as to produce a force equal and opposite to the torque caused by movement of an article mounted on the said tilt mounting head as said two relatively moveable parts move with respect to each other, said spring being at rest and thus non-stressed in a null position thereof wherein the load on the mounting head is directly above the pivot axis and no torque is generated.

2. A torque counterbalancing mechanism as claimed in claim 1 wherein the surface of the cam follower which mates with the corresponding surface of the cam is at least surface hardened.

3. A torque counterbalancing mechanism as claimed in claim 2 wherein the shape of the cam is such as to provide a linear relationship between the angle through which the cam pivots and the said force produced.

4. A torque counterbalancing mechanism as claimed in claim 3 wherein the spring is of a pre-selected rate.

5. A torque counterbalancing mechanism as claimed in claim 3 wherein the rate of the spring is alterable within the limits of the spring rate.

6. In a tilt mounting head of the type including two relatively moveable parts comprising a table top pivotable about a corresponding pivot point relative to a base, a torque counterbalancing mechanism comprising: a cam follower operably connected to one of the two relatively moveable parts of said tilt mounting head, a cam, having predetermined rise characteristics and being pivoted about a pivot point and operatively connected to the other of the two relatively moveable parts of the tilt mounting head, for controlling the movement of said cam follower in accordance with the rise characteristics of the cam, the pivot point of the at least one pivoted part being on the same pivot axis, and a spring for loading said cam follower and having a spring rate determined in conjunction with the rise characteristics of the cam so as to produce a force equal and opposite to the torque caused by movement of an article mounted on the said tilt mounting head as said two relatively moveable parts move with respect to each other, said spring being at rest and thus non-stressed in a null position thereof wherein the load on the mounting head is directly above the pivot axis and no torque is generated, said device further comprising a threaded means, on which a portion of said spring is threadably received, for effectively changing the operable length of said spring.

* * * * *